United States Patent Office 3,458,473
Patented July 29, 1969

3,458,473
PHENOLIC ANTIOXIDANT COMPOSITION
FOR POLYOLEFINS
William H. Starnes, Jr., Baytown, Tex., assignor to Esso Research and Engineering Company, a corporation of Delaware
No Drawing. Continuation of application Ser. No. 411,569, Nov. 16, 1964. This application Sept. 4, 1968, Ser. No. 767,025
Int. Cl. C08f 45/58
U.S. Cl. 260—45.95
7 Claims

ABSTRACT OF THE DISCLOSURE

Hindered trisphenols, such as, 1,3,5-tris(3-alkyl-4-hydroxyphenyl)benzene; 1,3,5-tris(3-aryl-4-hydroxyphenyl)benzene; or 1,3,5-tris(2-hydroxyphenyl) benzene and substituted derivatives thereof, are effective stabilizers in polyolefins due to low volatility, compatibility, and because the oxidation products are not highly colored.

---

This is a continuation of application Ser. No. 411,569, filed Nov. 16, 1964, now abandoned.

The present invention is directed to trisphenol compositions of matter. More particularly, the invention is concerned with hindered phenols which are of low volatility and do not form undesirable color products upon oxidation. In its more specific aspects, the invention is directed to the use of these hindered trisphenols as stabilizers in hydrocarbons, especially polyolefins, to render the hydrocarbon stable against oxidative degradation.

The present invention may be briefly described as compositions of matter having the following formulae:

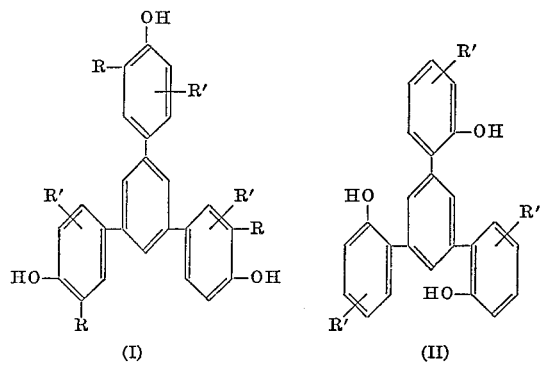

(I)     (II)

where R is a $C_1$ to $C_{12}$ alkyl or an aryl, and R' is hydrogen, a $C_1$ to $C_{12}$ alkyl or an aryl.

The trisphenols having minimum substitution may generally be named 1,3,5-tris(3-alkyl-4-hydroxyphenyl)-benzene or 1,3,5-tris(3-aryl-4-hydroxyphenyl)benzene (I) and 1,3,5-tris(2-hydroxyphenyl)benzene (II). It is to be noted, however, that the trisphenols may be partially or completely substituted and accordingly, R' as represented in the formulae above is to be considered as a substituent at each of the carbons not shown to have another substituent. The preferred trisphenols for stabilizers in hydrocarbons are 1,3,5-tris(3,5-dialkyl-4-hydroxyphenyl) benzenes.

In the stabilization of hydrocarbons and especially polyolefins, such as high molecular weight polypropylene, it is necessary to have a stabilizer which will stabilize the hydrocarbon over a wide range of conditions. One of the major problems about stabilizers is the formation of undesirable color products upon oxidation. Also, for high temperature applications, it is necessary to find a stabilizer exhibiting low volatility. In stabilizing a specific material such as polypropylene, a stabilizer, to be effective, must be compatible therewith. In the past, the most effective stabilizer systems for hydrocarbons have been stabilizer materials which were volatile and under certain operating conditions incompatible with the hydrocarbon.

It is an object of the present invention to produce trisphenols which are effective stabilizers for hydrocarbons over a wide range of operating conditions.

Another object is to provide trisphenol stabilizers for stabilizing polyolefins when used alone or together with a synergistic sulfur-containing material.

Further, it is an object to provide trisphenol stabilizers which are both nonvolatile and compatible when incorporated in a solid polyolefin.

Further objects will be obvious from the following description and examples.

The trisphenol compounds of the present invention may be generally shown by the following formulae:

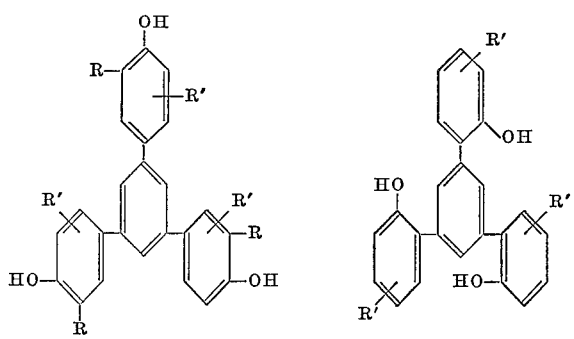

where R is a $C_1$ to $C_{12}$ alkyl or an aryl, and R' is hydrogen, a $C_1$ to $C_{12}$ alkyl or an aryl.

More specifically, the trisphenol compounds of the present invention are 1,3,5-tris(3-alkyl-4-hydroxyphenyl)benzene;
1,3,5-tris(3-aryl-4-hydroxyphenyl)benzene;
1,3,5-tris(3,5-dialkyl-4-hydroxyphenyl)benzene;
1,3,5-tris(3,6-diaryl-4-hydroxyphenyl)benzene;
1,3,5-tris(3-aryl-5-alkyl-4-hydroxyphenyl)benzene;
1,3,5-tris(2-hydroxyphenyl)benzene;
1,3,5-tris(3-alkyl-2-hydroxyphenyl)benzene;
1,3,5-tris(4-aryl-2-hydroxyphenyl)benzene;
1,3,5-tris(3,5-dialkyl-2-hydroxyphenyl)benzene;
1,3,5-tris(3-alkyl-5-aryl-2-hydroxyphenyl)benzene;
1,3,5-tris(3-aryl-6-alkyl-2-hydroxyphenyl)benzene;
1,3,5-tris(5-alkyl-2-hydroxyphenyl)benzene;
1,3,5-tris(4-aryl-2-hydroxyphenyl)benzene.

It has been further found that certain of the trisphenols of the present invention have characteristics which are distinct from certain other of the trisphenols. Thus, when the alkyl is one which is at least a $C_3$ or greater secondary or tertiary alkyl group which is ortho to the hydroxyl group, these trisphenols are referred to as "hindered phenols." Likewise, when the hydroxy group has an aryl group ortho to the hydroxyl group, it is considered to be "hindered." The hindered trisphenols of the present invention have been found to exhibit outstanding characteristics as stabilizers in that it appears that, when the hydroxy group is thus hindered, the capability as a stabilizer is considerably greater than when it is not so hindered.

The compositions of matter of the present invention are formed by the cyclo-trimerization of an acetylphenol which is the precursor. The acetylphenol precursors may be represented by the following formulae:

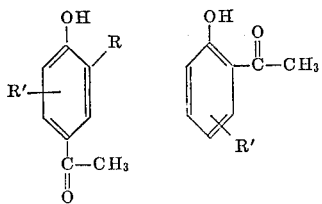

The method of preparing hte compositions of the present invention comprises forming a solution of the acetylphenol precursor and triethylorthoformate in a suitable solvent. The solution is then treated with gaseous hydrogen chloride, whereupon a product is formed. The product may be recovered by filtration or evaporation of the solvent and may be purified, if desired, by recrystallization, or other suitable means.

When the compositions of matter of the present invention are prepared, about 0.5 to 2 mols of triethylorthoformate is placed in solution with 1 mol of the acetylphenol precursor. Preferably a slight excess of the triethylorthoformate is used. Suitable solvents are the anhydrous alcohols, such as absolute ethanol, although benzene or other solvents which will dissolve both the acetylphenol precursor and triethylorthoformate may be used. The gaseous hydrogen chloride is usually bubbled into the solution for a sufficient time to obtain a considerable amount of precipitated solid. It is this solid material which is the desired product.

The compositions of matter of the present invention are useful as stabilizers to retard the oxidative degradation of fats, hydrocarbons and high molecular weight polyolefins. The compositions of matter are added to the materials to be stabilized in amounts from about 0.01 to about 1.5% by weight. The compositions of matter of the present invention are especially effective in high molecular weight solid polyolefins, and especially when a sulfur-containing costabilizer is also added. The addition of both the compositions of matter of the present invention and a sulfur-containing material having the following general formulae:

$$R(CH_2)_2—A_w—(CH_2)_2R$$

or $$R(CH_2)_2—A—R'—A—(CH_2)_2R$$

where:

A is S or S=O and
$w$ is 1, 2, 3, or 4 when A is S
R is

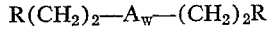

or

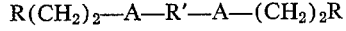

$x=1$ to 20; $y=0$ to 3.

R' is

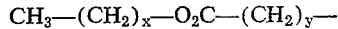

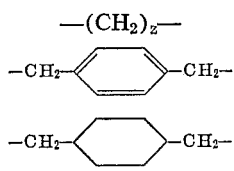

$z=1$ to 5 is found to have a synergistic effect in high molecular weight solid polyolefins.

Specific sulfur-containing costabilizers which may be incorporated in high molecular weight solid polyolefins together with the compositions of matter of the present invention, are exemplified by dilaurylthiodipropionate, distearylthiodipropionate, dilaurylthiodibutyrate, dilaurylsulfoxydipropionate, laurylstearylthiopropionate, dilauryldithiodipropionate, distearyltrithiodipropionate, bis(tetradecylmercapto)-p-xylylene, bis(octadecylmercapto)-p-xylylene, 19,24-dithiotetracontane, 19,25-dithiohentetetracontane, dicetyl sulfide, dicetyl disulfide, and the like.

The compositions of matter of the present invention when used as stabilizers for high molecular weight polyolefins are used in amounts from about 0.01 to about 1.0 weight percent of the polymer to be stabilized. Preferably the polymers are stabilized using amounts from about 0.05 to about 0.20% by weight. The sulfur-containing costabilizers are used in amounts from about 0.05 to about 2.0% by weight with a preferred amount from about 0.1 to about 0.7% by weight.

The polyolefin polymers stabilized or treated in accordance with the present invention are polymers which are produced by the well-known methods. The polymers may be illustrated by those produced by the high pressure, low pressure, or Ziegler-type polymerization process. The polyolefin polymers are exemplified by polymers of alpha-olefins having 2 to 8 carbon atoms in the molecule and may be illustrated by polyethylene, polypropylene, ethylene-propylene copolymers, ethylene-butene-1 copolymers, ethylene-pentene-1copolymers, and the like, having molecular weights in the range from about 10,000 to about 1,000,000. The polymers which are specifically illustrated for treatment in accordance with the present invention were produced by polymerization of the corresponding olefins employing the Ziegler-type polymerization catalyst.

In employing the compositions of matter of the present invention, they may be added to a polyolefin dissolved in a suitable solvent, as, for example, an aromatic hydrocarbon. The solution may be sprayed over the pellets or particles of the polyolefin and the resulting mixture then extruded through a suitable extrusion device to form a homogeneous mixture. The compositions of matter may also be added as a dry solid where the compositions of matter so exist. After adding the compositions of matter of the present invention to the polymer particles, the resulting mixture may be milled or extruded or passed through other mixing devices to intimately admix the polymer particles with the solid compositions of matter of the present invention to form a homogeneous mixture. The sulfur-containing costabilizer when employed may also be added to the polymer particles in a manner similar to that of the addition of the compositions of matter of the present invention.

The invention will be further illustrated by the following specific examples which are given by way of illustration and not as limitations on the scope of the invention.

Example I

A solution of 2,6-di-t-butyl-4-acetylphenol (54.5 g., 0.219 mol) and triethyl orthoformate (48.7 g., 0.329 mol) in 1500 ml. of absolute ethanol is stirred and treated with a rapid stream of gaseous hydrogen chloride. The temperature rises to the boiling point of the solvent soon after introduction of hydrogen chloride is begun and remains at 68–78° throughout the remainder of the reaction period. A considerable amount of solid precipitates during the first thirty minutes, and an additional 200 ml. of absolute ethanol is added at this point to facilitate mixing. After three hours the flow of hydrogen chloride is discontinued, and the mixture is cooled to room temperature. It is then filtered, and the recovered cream-colored solid is washed several times with small portions of cold absolute ethanol. This material weighs 37.2 g. (74% yield) and has M.P. 319.5–321°. Recrystallization from ethanol-benzene or (preferably) dioxane-water containing a few drops of hydrazine gives a snow-white product melting at 323–325°. When dioxane-water is used as the recrystallization solvent, the recovered material is found to contain considerable amounts of dioxane in the form of a molecular complex; however, the dioxane can be readily removed by heating the crystals overnight at 175° under vacuum. The product, 1,3,5 - tris(3,5-di-t-butyl-4-hydroxyphenyl) benzene, is shown to have the composition $C_{48}H_{66}O_3$ by exact molecular weight measurements (high resolution mass spectrometry). Nuclear magnetic resonance (NMR) and infrared data are used to rigorously establish the structure.

Example II

A solution of 2-acetyl-4-methylphenol (0.20 mol) and triethylorthoformate (0.30 mol) is formed in 2,000 ml. of benzene. The solution is stirred and treated with a stream of gaseous hydrogen chloride. After a period of time, the flow of hydrogen chloride is discontinued and the mixture is cooled to room temperature. The solvent is evaporated and a solid recovered. The product obtained is 1,3,5-tris(5-methyl-2-hydroxyphenyl) benzene.

Other specific trisphenol compositions of matter of the present invention may be prepared in accordance with the specific examples as illustrated above. Both of the specific examples illustrate hindered phenols.

The present invention will be further illustrated by the following data which are given by way of illustration and not by limitation on the scope of the present invention.

The effectiveness of one of the preferred compositions of matter of the present invention as a stabilizer is set forth in Table I, illustrating the utility of the trisphenol compounds of the present invention. Included in Table I is data regarding color which shows that the trisphenol of the present invention does not produce color upon the incorporation of the stabilizer system into the polyolefin, polypropylene formed by a Ziegler-type cataylst, by extruding the mixture to form pellets of about 75 mils. The pellets are placed in a U-tube and air at 150° C. is passed over the pellets to determine the oxidative stability. The sulfur-containing costabilizer DLTDP is dilaurylthiodipropionate. The color of the polypropylene upon incorporation of the stabilizer system is given a numerical rating from 1 to 10 with the larger number associated with the most color. A 1 color is white.

TABLE I

| Stabilizer system | Wt. percent | Color | Oxidative stability, days[1] |
| --- | --- | --- | --- |
| None | | 1 | <1 |
| Compound Example I | 0.1 | 1 | 1 |
| DLTDP, Compound Example I | 0.3, 0.1 | 1 | 43 |
| DLTDP, Compound A | 0.3, 0.1 | 4+ | 29 |
| DLTDP, Compound B | 0.3, 0.1 | 2 | 20 |
| DLTDP, Compound C | 0.3, 0.1 | 3+ | 19 |
| DLTDP, Compound D | 0.3, 0.1 | 2+ | 20 |

[1] U-tube, air, 150° C., 75 mil pellets.
Compound B—4,4'-butylidenebis(2-t-butyl-5-methylphenol).
Compound C—2,2'-methylenebis(4-methyl-6-t-butylphenol).
Compound D—4,4'-thiobis(2-t-butyl-5-methyl-phenol).
Compound A—A product obtained from the reaction of 3 mols 2-t-butyl-5-methylphenol and 1 mol crotonaldehyde.

To illustrate the low volatility of the trisphenol of the present invention, polypropylene pads of 10 mil thickness were formed and placed in an air-circulating oven at 280° F. By this test it has been found that stabilizer materials having high volatility quickly fail. The sulfur-containing costabilizer DSTDP used is distearyl-thiodipropionate, being less volatile than DLTDP.

TABLE II

| Stabilizer system | Wt. percent | Oxidative stability,[1] days |
| --- | --- | --- |
| DSTDP, Compound A | 0.7, 0.2 | 44 |
| DSTDP, Compound B | 0.7, 0.2 | 24 |
| DSTDP, Compound Example I | 0.7, 0.2 | >75 |

[1] 280° F., air-circulating oven, 10 mil pads.
Compounds A and B—Same as Table I.

The nature and object of the present invention having been completely described and illustrated and the best mode thereof contemplated set forth, what I wish to claim as new and useful and secure by Letters Patent is:

1. A composition comprising a solid polymer of an alpha-olefin having 2 to 8 carbon atoms and stabilizing amount of trisphenol having one of the following formulas:

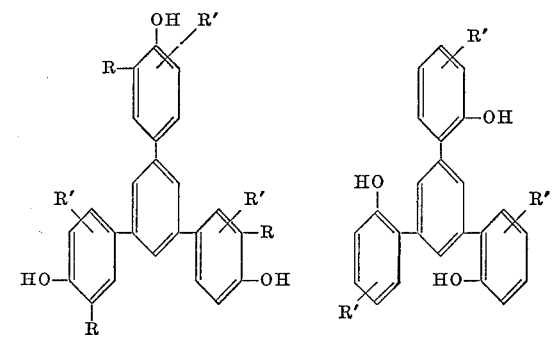

where:
R is a $C_1$ to $C_{12}$ alkyl or an aryl
R' is hydrogen, a $C_1$ to $C_{12}$ alkyl or an aryl.

2. A composition according to claim 1 wherein said trisphenol has the following formula:

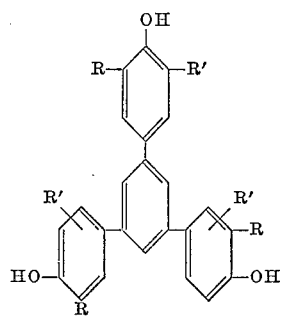

where:
R is a $C_1$ to $C_{12}$ alkyl or an aryl
R' is hydrogen, a $C_1$ to $C_{12}$ alkyl or an aryl.

3. A composition according to claim 2 wherein said trisphenol is 1,3,5-tris(3,5-di-t-butyl-4-hydroxy phenyl) benzene.

4. A composition according to claim 2 wherein said polymer is polypropylene.

5. A composition according to claim 1 wherein said trisphenol has the following formula:

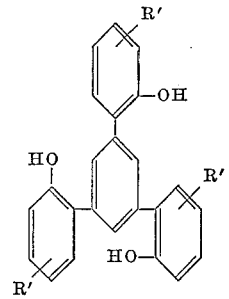

where R' is hydrogen, a $C_1$ to $C_{12}$ alkyl or an aryl.

6. A composition according to claim 5 wherein said trisphenol is 1,3,5-tris(5-methyl-2-hydroxy phenyl)benzene.

7. A composition according to claim 5 wherein said polymer is polypropylene.

No references cited.

DONALD E. CZAJA, Primary Examiner

M. J. WELSH, Assistant Examiner

U.S. Cl. X.R.

260—45.7, 45.85